(12) United States Patent
Su et al.

(10) Patent No.: US 11,487,140 B2
(45) Date of Patent: Nov. 1, 2022

(54) BACKLIGHT ASSEMBLY AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Xuezhen Su, Beijing (CN); Jianming Huang, Beijing (CN); Heling Zhu, Beijing (CN); Li Cheng, Beijing (CN); Yabin Lin, Beijing (CN); Aihua Zhu, Beijing (CN); Xiaobo Jia, Beijing (CN); Wanping Pan, Beijing (CN); Hailong Yu, Beijing (CN)

(73) Assignees: FUZHOU BOE OPTOELECTRONICS TECHNOLOGY CO., LTD., Fujian (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/209,534

(22) Filed: Mar. 23, 2021

(65) Prior Publication Data
US 2021/0302768 A1    Sep. 30, 2021

(30) Foreign Application Priority Data
Mar. 24, 2020   (CN) .......................... 202010215045.6

(51) Int. Cl.
G02F 1/13   (2006.01)
F21V 8/00   (2006.01)
(Continued)

(52) U.S. Cl.
CPC ........... *G02F 1/1323* (2013.01); *G02B 6/005* (2013.01); *G02F 1/137* (2013.01); *G02F 1/1334* (2013.01);
(Continued)

(58) Field of Classification Search
CPC ................. G02F 1/1323; G02F 1/1334; G02F 1/133526; G02F 1/133528; G02F 1/137;
(Continued)

(56) References Cited

U.S. PATENT DOCUMENTS

2002/0191128 A1* 12/2002 Okumura .............. G02F 1/1393
    349/96
2008/0311691 A1   12/2008 Baek
(Continued)

FOREIGN PATENT DOCUMENTS

CN   101975360 A   2/2011
CN   104769461 A   7/2015
(Continued)

OTHER PUBLICATIONS

Chinese First Office Action dated Jul. 26, 2021 corresponding to application No. 202010215045.6.

*Primary Examiner* — Donald L Raleigh
(74) *Attorney, Agent, or Firm* — Nath, Goldberg & Meyer; Joshua B. Goldberg (57) ABSTRACT

A backlight assembly and a display device including the backlight assembly are provided. The backlight assembly includes a light source unit, a peep-proof layer on a light emitting side of the light source unit, a light adjustment layer on a side of the peep-proof layer distal to the light source unit, and a plurality of first microstructures between the peep-proof layer and the light adjustment layer and spaced apart from each other.

18 Claims, 4 Drawing Sheets

(51) Int. Cl.
  *G02F 1/1334* (2006.01)
  *G02F 1/1335* (2006.01)
  *G02F 1/137* (2006.01)

(52) U.S. Cl.
  CPC .. *G02F 1/133526* (2013.01); *G02F 1/133528* (2013.01); *G02F 2202/40* (2013.01)

(58) Field of Classification Search
  CPC ............ G02F 2202/40; G02F 2203/62; G02F 1/13306; G02F 1/1347; G02F 1/133606; G02F 1/133607; G02B 6/005; G02B 6/0051
  See application file for complete search history.

(56) References Cited

U.S. PATENT DOCUMENTS

| | | | |
|---|---|---|---|
| 2018/0210243 A1* | 7/2018 | Fang | G02F 1/133528 |
| 2021/0191192 A1* | 6/2021 | Zhu | G02F 1/1323 |

FOREIGN PATENT DOCUMENTS

| | | | | |
|---|---|---|---|---|
| CN | 204964945 U | 1/2016 | | |
| CN | 106168691 A | 11/2016 | | |
| CN | 106773180 A | 5/2017 | | |
| CN | 209281112 U | 8/2019 | | |
| CN | 209373986 U | 9/2019 | | |
| CN | 110297341 A | * 10/2019 | ............... | G02B 1/14 |
| CN | 110297341 A | 10/2019 | | |

\* cited by examiner

BACKLIGHT ASSEMBLY AND DISPLAY DEVICE

CROSS REFERENCE TO RELATED APPLICATIONS

This application claims the priority of Chinese patent application No. 202010215045.6, filed on Mar. 24, 2020, the content of which is incorporated herein by reference in its entirety.

TECHNICAL FIELD

The present disclosure relates to the field of display technology, and in particular to a backlight assembly and a display device.

BACKGROUND

With the continuous development of display technologies, in order to obtain better display effects, a viewing angle of a display panel is intended to be relatively large at present. However, when displaying with a large viewing angle is realized, a displayed picture of the display panel is easy to be peeped by other users, causing privacy leakage and even a risk of property loss of a user. Therefore, it is desirable to provide a display device having a peep-proof display mode and a normal display mode (which is also referred to as a shared display mode) and having an improved display effect.

SUMMARY

A first embodiment of the present disclosure provides a backlight assembly, including:
 a light source unit;
 a peep-proof layer on a light emitting side of the light source unit;
 a light adjustment layer on a side of the peep-proof layer distal to the light source unit; and
 a plurality of first microstructures between the peep-proof layer and the light adjustment layer and spaced apart from each other.
 In an embodiment, the plurality of first microstructures includes a plurality of transparent particles or a plurality of microlenses.
 In an embodiment, the plurality of first microstructures are integrally formed with the light adjustment layer or with the peep-proof layer.
 In an embodiment, the light adjustment layer includes polymer dispersed liquid crystal.
 In an embodiment, a diameter of each of the plurality of transparent particles or a diameter of each of the plurality of microlenses is in a range of 50 μm to 100 μm.
 In an embodiment, the plurality of microlenses have a same diameter and are uniformly distributed in an array.
 In an embodiment, an interval between any adjacent two of the plurality of microlenses is greater than a radius of any one of the plurality of microlenses.
 In an embodiment, the plurality of first microstructures are on a surface of the light adjustment layer proximal to the peep-proof layer, or on a surface of the peep-proof layer proximal to the light adjustment layer.
 In an embodiment, the surface of the light adjustment layer proximal to the peep-proof layer or the surface of the peep-proof layer proximal to the light adjustment layer has a haze degree of 10% to 25%.

A second embodiment of the present disclosure provides a display device, including:
 the backlight assembly according to any one of the embodiments of the first embodiment of the present disclosure;
 a display panel on the light adjustment layer; and
 a first polarizer on a side of the display panel proximal to the light adjustment layer and a second polarizer on a side of the display panel distal to the light adjustment layer;
 wherein the display device further includes a preset gap between the first polarizer and the light adjustment layer.
 In an embodiment, a surface of the first polarizer proximal to the light adjustment layer is a matte surface and/or a surface of the light adjustment layer proximal to the first polarizer is a matte surface.
 In an embodiment, the surface of the first polarizer proximal to the light adjustment layer and/or the surface of the light adjustment layer proximal to the first polarizer each have a haze degree of 10% to 25%.
 In an embodiment, the display device further includes a plurality of second microstructures, which are spaced apart from each other and on a side of the first polarizer proximal to the light adjustment layer and/or on a side of the light adjustment layer proximal to the first polarizer.
 In an embodiment, the plurality of second microstructures includes a plurality of transparent particles or a plurality of microlenses.
 In an embodiment, the plurality of second microstructures are integrally formed with the light adjustment layer or with the first polarizer.
 In an embodiment, a diameter of each of the plurality of transparent particles or a diameter of each of the plurality of microlenses is in a range of 50 μm to 100 μm.
 In an embodiment, the plurality of microlenses have a same diameter and are uniformly distributed in an array.
 In an embodiment, an interval between any adjacent two of the plurality of microlenses is greater than a radius of any one of the plurality of microlenses.
 In an embodiment, the plurality of second microstructures are on a surface of the light adjustment layer proximal to the first polarizer or on a surface of the first polarizer proximal to the light adjustment layer.
 In an embodiment, the preset gap is 2 mm.

DETAILED DESCRIPTION

To enable one of ordinary skill to better understand technical solutions of the present disclosure, the present disclosure will be further described in detail below with reference to the accompanying drawings and exemplary embodiments.

The inventors of the present inventive concept have found that, at present, a combination of a peep-proof layer and a light adjustment layer may be employed to realize a peep-proof display mode and a normal display mode (which is also referred to as a shared display mode) of a display device, and realize switching between the peep-proof display mode and the normal display mode. However, such a display device has the following problems. Firstly, in a manufacturing process of the display device, a light adjustment layer is easily adsorbed by another adjacent film layer (particularly, a film layer having a glossy or smooth surface) due to thermal expansion, electrostatic absorption, and the like. Secondly, the light adjustment layer generally has a poor pressure resistance due to the characteristics of a material of the light adjustment layer, and is sensitive to foreign matter (such as one or more particles like dust), which easily results in low assembly yield and a poor display effect of the final product.

To solve at least the above technical problems, embodiments of the present disclosure provide a backlight assembly and a display device as further described below.

Figure 1:
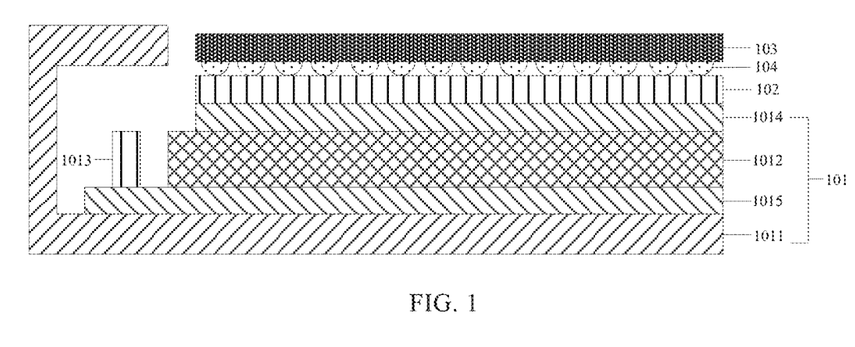
FIG. 1 is a schematic diagram showing a structure of a backlight assembly according to an embodiment of the present disclosure.

FIG. 1 is a schematic diagram showing a structure of a backlight assembly according to an embodiment of the present disclosure. As shown in FIG. 1, the backlight assembly may include: a light source unit 101, a peep-proof layer (or an anti-peep layer) 102 located on a light-emitting side of the light source unit 101 (e.g., the upper side of the light source unit 101 shown in FIG. 1), and a light adjustment layer 103 located on a side of the peep-proof layer 102 distal to the light source unit 101. In addition, the backlight assembly may further include a plurality of first microstructures 104 disposed with an interval therebetween (or spaced apart from each other) and disposed between the peep-proof layer 102 and the light adjustment layer 103.

In the backlight assembly provided by the above embodiment of the present disclosure, light output from the light source unit 101 may be incident on the peep-proof layer 102. When an incident angle at which the light is incident on the peep-proof layer 102 is greater than or equal to a preset value, the light cannot exit from the peep-proof layer 102 under a light-blocking effect of the peep-proof layer 102. When the incident angle at which the light is incident on the peep-proof layer 102 is smaller than the preset value, the light may exit from the peep-proof layer 102. Therefore, the light generated by the light source unit 101 is limited within a certain angle, thereby realizing a peep-proof function. When the light adjustment layer 103 is in a transparent state, the light is incident on the light adjustment layer 103 at a relatively small angle and passes through the light adjustment layer 103 with the angle unchanged, to provide a narrow viewing angle, realizing the peep-proof display mode. When the light adjustment layer 103 is in a scattering state, light passing through the light adjustment layer 103 will be scattered and thus be transmitted at a relatively large angle to provide light with a wide viewing angle, realizing the normal display mode. Therefore, the backlight assembly provided by the present embodiment can realize switching between the peep-proof display mode and the normal display mode, thereby meeting the requirements of users in different scenarios. Meanwhile, a certain space can be formed between any adjacent two of the first microstructures 104 to accommodate a small foreign matter during a manufacturing process, thereby preventing the foreign matter from having an influence on a structural distribution of the light adjustment layer 103, and thus avoiding the pockmark defect caused by the foreign matter. Thus, an assembly yield of the backlight assembly can be improved, and the manufacturing cost thereof can be saved.

Figure 2:
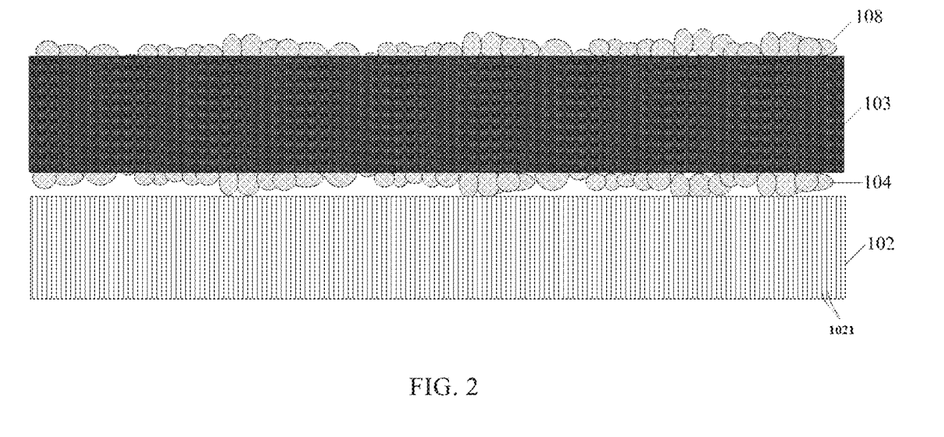
FIG. 2 is schematic diagram showing a structure of another backlight assembly according to an embodiment of the present disclosure.
Figure 3:
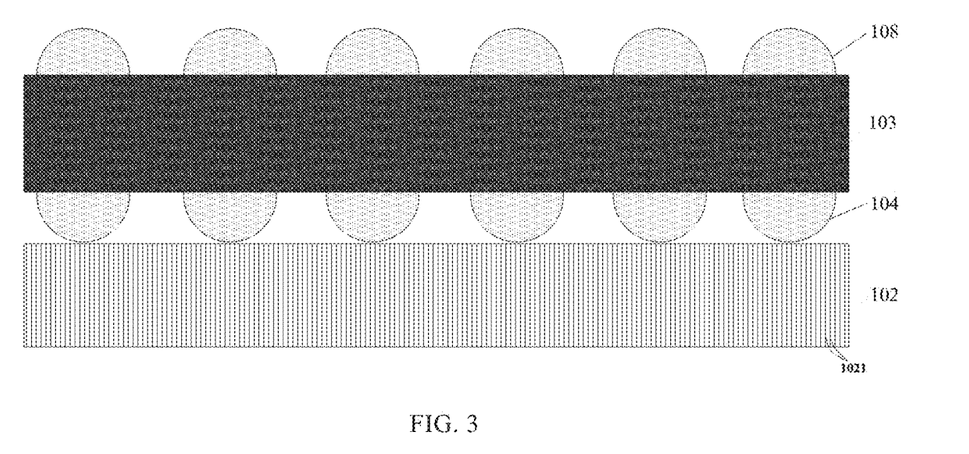
FIG. 3 is a schematic diagram showing a structure of still another backlight assembly according to an embodiment of the present disclosure.

In some embodiments, as shown in FIGS. 2 and 3, the peep-proof layer 102 may include a plurality of light-blocking walls 1021. A light-transmitting region is formed between any adjacent two of the light-blocking walls 1021, and a side surface of each light-blocking wall 1021 proximal to the light-transmitting region is a light-blocking surface. In the present embodiment, each light-blocking wall 1021 (or each light-blocking surface) may be made of a light reflecting material or a light absorbing material, such that the light may be limited in an angle defined by any adjacent two of the light-blocking walls 1021, and the peep-proof function is achieved.

Figure 5:
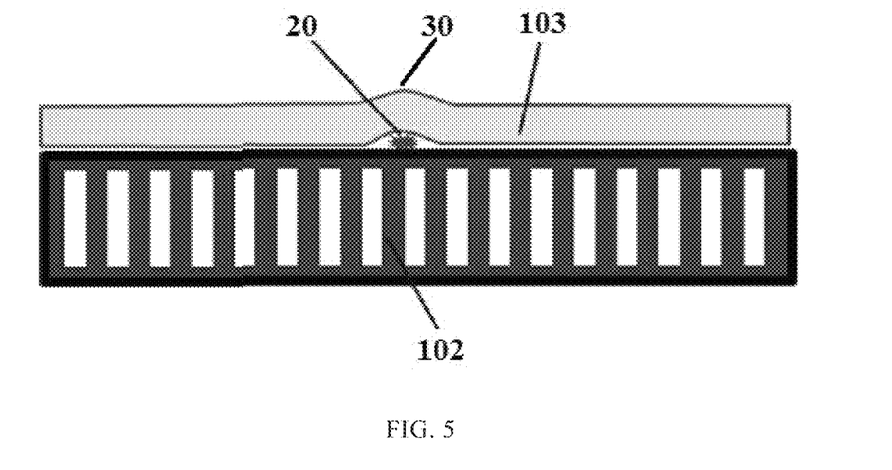
FIG. 5 is a schematic diagram showing that a pockmark defect is generated because foreign matter causes a light adjustment layer to have a protrusion, according to an embodiment of the present disclosure.

In an actual manufacturing environment of the backlight assembly and/or a display device, the requirement of complete dust-free generally cannot be met. In other words, foreign matter 20 such as dust is present in the actual manufacturing environment, as shown in FIG. 5. During the manufacturing process of the backlight assembly, the foreign matter 20 may exist between the peep-proof layer 102 and the light adjustment layer 103. In this case, the foreign matter 20 may cause the light adjustment layer 103 to have a protrusion 30. Since the light adjustment layer 103 has a poor pressure resistance (reference may be made to a structure of the light adjustment layer 103 described below with reference to FIG. 6), the light adjustment layer 103 is sensitive to the foreign matter 20, and thus the protrusion 30 is easily generated on the light adjustment layer 103 at a position corresponding to the foreign matter 20. When a display device including the backlight assembly is in the normal display mode (i.e., the shared display mode or a large viewing angle display mode), an arrangement of liquid crystal molecules in a portion of the light adjustment layer 103 adjacent to the protrusion 30 is different from an arrangement of liquid crystal molecules in the remaining portion of the light adjustment layer 103, such that light in the portion of the light adjustment layer 103 adjacent to the protrusion 30 is abnormal, and appears as a protrusion defect (also referred to as the pockmark defect) on a screen. The foreign matter 20 generally has a diameter of about 1 micron (μm).

In some embodiments, as shown in FIGS. 2 and 3, each of the first microstructures 104 may include a transparent particle or a microlens.

For example, a plurality of transparent particles may be formed (e.g., coated) as the plurality of first microstructures 104, and any adjacent two of the plurality of transparent particles may have a certain interval (i.e., a space) therebetween to accommodate any tiny foreign matter that may be present during the manufacturing process, such that the foreign matter may be prevented from affecting the structural distribution of the light adjustment layer 103 (as shown in FIG. 2). In this way, the pockmark defect caused by the foreign matter can be avoided, the assembly yield of the backlight assembly can be improved, and the manufacturing cost thereof can be saved. Similarly, in a case where each of the first microstructures 104 includes a microlens, any adjacent two of the microlenses may have a certain interval (i.e., a space) therebetween to accommodate any tiny foreign matter that may be present during the manufacturing process (as shown in FIG. 3). Different from the plurality of transparent particles as described above, the plurality of microlenses can further cause light to converge to a certain extent except being capable of accommodating any foreign matter therebetween, so as to further improve the peep-proof effect.

For example, a diameter of each of the plurality of transparent particles or a diameter of each of the plurality of microlenses is in a range of 50 μm to 100 μm. Thus, the diameter of each transparent particle or the diameter of each microlens is much greater than the diameter of each foreign matter 20, such that the light adjustment layer 103 will not be caused to have the protrusion 30. In addition, since the diameter of each transparent particle or the diameter of each microlens is in the range of 50 μm to 100 μm, it can be ensured that the light output from the backlight assembly is transmitted normally, and thus that the display device including the backlight assembly has a high display quality. In addition, since the diameter of each transparent particle or the diameter of each microlens is in the range of 50 μm to 100 μm, it can be ensured that the foreign matter 20 having the diameter of about 1 μm is located between any adjacent two of the transparent particles or between any adjacent two of the microlenses, thereby preventing the foreign matter 20 from causing the light adjustment layer 103 to have the protrusion 30.

For example, the plurality of microlenses may have the same diameter and may be uniformly distributed in an array, such that the light adjustment layer 103 can be completely prevented from having the protrusion 30 and the manufacturing difficulty of the backlight assembly can be reduced.

Figure 7:
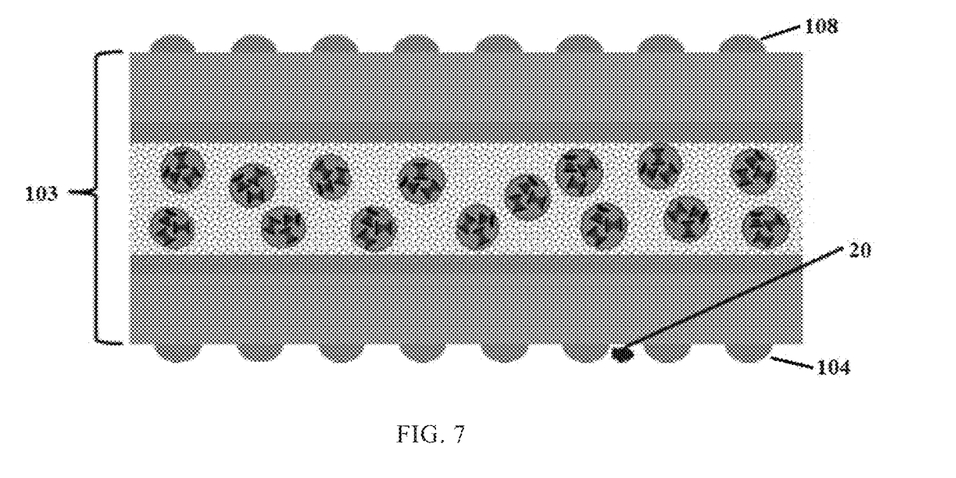
FIG. 7 is a schematic diagram showing that foreign matter is located in a space between any adjacent two of first microstructures, according to an embodiment of the present disclosure.

For example, an interval between any adjacent two of the plurality of microlenses is greater than a radius of any one of the plurality of microlenses. As such, even if a plurality of pieces of foreign matter 20 exist between any adjacent two of the microlenses, the plurality of pieces of foreign matter 20 will not cause the light adjustment layer 103 to have any protrusion 30, as shown in FIG. 7.

In some embodiments, each of the first microstructures 104 and the light adjustment layer 103 are integrally formed, or each of the first microstructures 104 and the peep-proof layer 102 are integrally formed. For example, the plurality of first microstructures 104 are located on a surface of the light adjustment layer 103 proximal to the peep-proof layer 102, or on a surface of the peep-proof layer 102 proximal to the light adjustment layer 103.

It should be noted that, each of the first microstructures 104 may be integrated with the light adjustment layer 103, i.e., each of the first microstructures 104 is formed on the light adjustment layer 103. Alternatively, each of the first microstructures 104 may be integrated with the peep-proof layer 102, i.e., each of the first microstructures 104 is formed on the peep-proof layer 102. For example, in a manufacturing process, the transparent particles may be coated on or the microlenses may be formed on a side of the light adjustment layer 103 proximal to the peep-proof layer 102, and alternatively, the transparent particles may be coated on or the microlenses may be formed on a side of the peep-proof layer 102 proximal to the light adjustment layer 103. In an embodiment of the present disclosure, it is feasible that any adjacent two of the first microstructures 104 may form a certain space therebetween to accommodate foreign matter.

In an embodiment, a haze degree of the surface of the light adjustment layer 103 proximal to the peep-proof layer 102 or the surface of the peep-proof layer 102 proximal to the light adjustment layer 103 is 10% to 25%, to ensure that the light adjustment layer 103 will not have any protrusion 30 and the backlight assembly will output light meeting requirements. It should be understood that in the present disclosure, a surface provided with the plurality of first microstructures 104 (i.e., the plurality of transparent particles or the plurality of microlenses) or a plurality of second microstructures 108 (i.e., a plurality of transparent particles or a plurality of microlenses) as described below may be referred to as a matte surface (e.g., a rough surface that diffusely reflects light). Further, the haze degree in the present disclosure may refer to a ratio of an area of a portion of a surface (i.e., the matte surface) covered by the plurality of first microstructures 104 or the plurality of second microstructures 108 to a total area of the surface.

Figure 6:
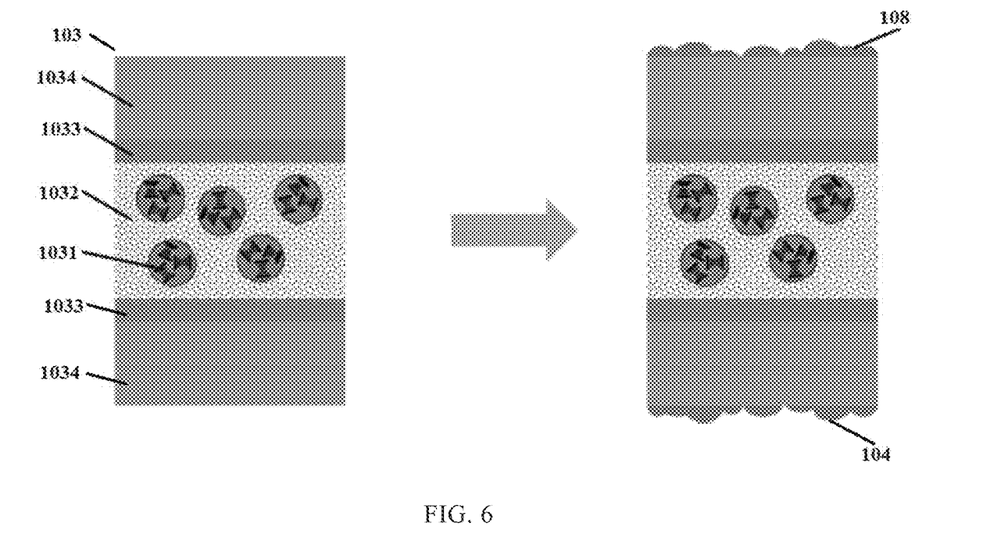
FIG. 6 is a schematic diagram showing a structure of a light adjustment layer and first and second microstructures respectively formed on lower and upper surfaces of the light adjustment layer, according to an embodiment of the present disclosure.

In some embodiments, the light adjustment layer 103 includes polymer dispersed liquid crystal. For example, the polymer dispersed liquid crystal includes a mixture of a plurality of liquid crystal molecules 1031 and a polymer 1032, as shown in FIG. 6.

For example, in a case where the light adjustment layer 103 includes a polymer dispersed liquid crystal layer (i.e., a layer formed by the plurality of liquid crystal molecules 1031 and the polymer 1032), two electrode layers 1033 may be disposed on opposite sides of the polymer dispersed liquid crystal layer, respectively. When different electrical signals are applied to the two electrode layers 1033, an electric field is formed between the two electrode layers 1033. Under the action of the electric field, the liquid crystal molecules 1031 may be regularly distributed along a direction of the electric field, such that the light adjustment layer 103 is in the transparent state, and the light may be transmitted through the light adjustment layer 103 at a small angle. When no electric signal or the same electric signal is applied to the two electrode layers 1033, an electric field is not formed between the two electrode layers 1033. In this case, the liquid crystal molecules 1031 are irregularly distributed, such that the light adjustment layer 103 is in the scattering state, and the light can be transmitted through the light adjustment layer 103 at a large angle. Thus, under the action of the electric field between the upper and lower electrode layers 1033, the liquid crystal molecules 1031 may change the deflection (or rotation) angle, thereby adjusting a transmission angle of the light and thus realizing the switching between the normal display mode and the peep-proof display mode. In addition, the light adjustment layer 103 may further include a substrate layer 1034 (which may be made of polyethylene terephthalate (PET)) on a side of each electrode layer 1033 (which may be made of a transparent conductive material such as Indium Tin Oxide (ITO)) distal to the polymer dispersed liquid crystal layer. The light adjustment layer 103 having the above structure is likely to generate the protrusion 30 in a case of being pressed by the foreign matter 20.

In some embodiments, as shown in FIG. 1, the light source unit 101 may include: a back frame 1011 having a shape similar to a U-shape, a light guide plate 1012 disposed within the back frame 1011, at least one light emitting device 1013 disposed on a light incident side of the light guide plate 1012 (e.g., the left side of the light guide plate 1012 shown in FIG. 1), an optical film 1014 disposed on a light emitting side of the light guide plate 1012 (e.g., the upper side of the light guide plate 1012 shown in FIG. 1), and a reflector 1015 disposed between a bottom surface of the light guide plate 1012 and the back frame 1011. The light output from each light emitting device 1013 may be transmitted through the light guide plate 1012. The reflector 1015 may reflect the light such that the light emits from the light emitting side of the light guide plate 1012. The optical film 1014 may be, for example, a scattering object (i.e., a scatterer) and may scatter the light exiting from the light emitting side of the light guide plate 1012 to obtain light with a wider angle and a more uniform brightness. It is to be understood that, the light source unit 101 described above may be a light emitting diode (LED) light source unit. Alternatively, the light source unit 101 may also be an organic light emitting diode (OLED) light source unit, and in this case, the peep-proof layer 102 and the light adjustment layer 103 can also enable the OLED light source unit to achieve switching between the peep-proof display mode and the normal display mode, and prevent the pockmark defect from occurring, thereby improving the display effect. For example, the OLED light source unit may include an anode, a cathode, and a light emitting layer between the anode and the cathode, and may emit light toward the peep-proof layer 102.

Figure 4:
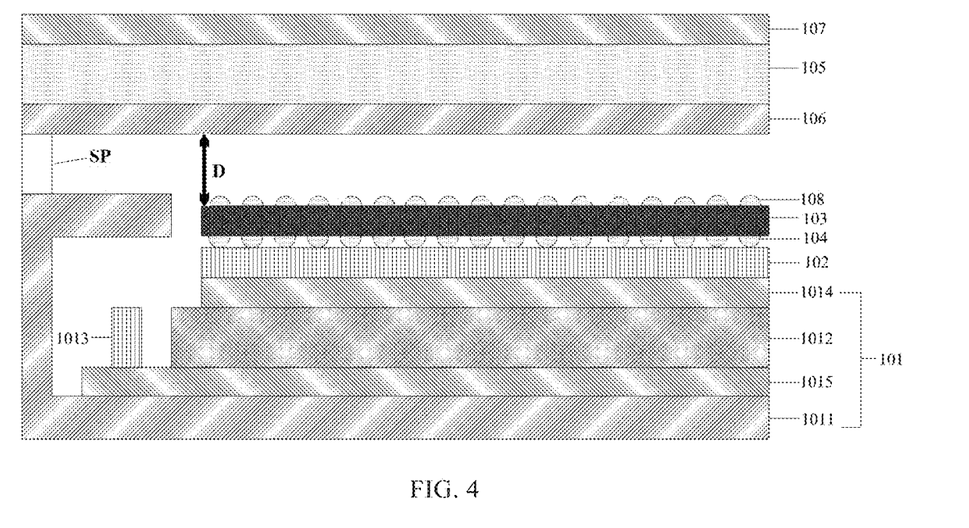
FIG. 4 is a schematic diagram showing a structure of a display device according to an embodiment of the present disclosure.

FIG. 4 is a schematic diagram showing a structure of a display device according to an embodiment of the present disclosure. As shown in FIG. 4, the display device may include the backlight assembly (e.g., the backlight assembly shown in FIG. 1) provided in the above embodiments, and may further include: a display panel 105 disposed on the light adjustment layer 103 (e.g., disposed on a light emitting side of the light adjustment layer 103), a first polarizer 106 disposed on a side of the display panel 105 proximal to the light adjustment layer 103, and a second polarizer 107 disposed on a side of the display panel 105 distal to the light adjustment layer 103. For example, a preset gap (i.e., preset interval or preset distance) D is provided between the first polarizer 106 and the light adjustment layer 103. For example, as shown in FIG. 4, a spacer SP may be disposed between the first polarizer 106 and the back frame 1011 of the backlight assembly 101 to maintain the preset gap D. In an embodiment, the preset gap D is about 2 mm, which ensures the display device has a normal display function and a small thickness.

It should be noted that, in the display device provided by the present embodiment, the display panel 105 may be a liquid crystal display panel, and the backlight assembly may provide backlight for the liquid crystal display panel. In order to cooperate with the function of causing liquid crystal molecules to rotate so as to control a propagation direction of the light in the liquid crystal display panel, the first polarizer 106 and the second polarizer 107 may be respectively disposed at opposite sides of the liquid crystal display panel. In a manufacturing process, due to factors such as a processing error and an assembling process, when the backlight assembly is assembled with the liquid crystal display panel having the first polarizer 106 and the second polarizer 107 on two sides, the preset gap D is formed between the first polarizer 106 and the light adjustment layer 103 to prevent the first polarizer 106 from contacting the light adjustment layer 103, thereby preventing rainbow stripes from occurring.

In some embodiments, a surface of the first polarizer 106 proximal to the light adjustment layer 103 is formed as a matte surface (not shown) and/or a surface of the light adjustment layer 103 proximal to the first polarizer 106 is formed as a matte surface. Thus, the first polarizer 106 and the light adjustment layer 103 may be prevented from adsorbing each other.

It should be noted that, since a certain gap exists between the first polarizer 106 and the light adjustment layer 103, during performing a display function, if both the first polarizer 106 and the light adjustment layer 103 have smooth (i.e., planar or substantially planar) surfaces opposite to each other, the light adjustment layer 103 is easily be adsorbed by the first polarizer 106, such that a part of the structure of the light adjustment layer 103 is adsorbed to the first polarizer 106, and an air gap (or air layer) with a nonuniform thickness is easily formed. In the case where such an air gap is formed, light passes through the light adjustment layer 103, passes through the air gap, and then is incident on the first polarizer 106. Since optical lengths of light rays passing through the air gap and the first polarizer 106 in different paths are different, a defect of rainbow stripes (e.g., the rainbow stripes) is likely to occur. In the display device provided by the present embodiment, the surface of the first polarizer 106 and/or the surface of the light adjustment layer 103 are processed, such that the surface of the first polarizer 106 proximal to the light adjustment layer 103 and/or the surface of the light adjustment layer 103 proximal to the first polarizer 106 is(are) matte surface(s). Mutual adsorption generally does not occur between a film layer having smooth surfaces and a film layer having matte surfaces, or between two film layers each having matte surfaces. As such, it is difficult for mutual adsorption to occur between first polarizer 106 and the light adjustment layer 103. Therefore, a uniform distribution of the light adjustment layer 103 can be ensured, thereby ensuring the air layer between the first polarizer 106 and the light adjustment layer 103 to have a uniform thickness, avoiding the defect of rainbow stripes, and improving the display effect.

In some embodiments, the surface of the first polarizer 106 proximal to the light adjustment layer 103 and/or the surface of the light adjustment layer 103 proximal to the first polarizer 106 each have a haze degree of 10% to 25%.

It should be noted that a too low haze degree of a film layer may not effectively prevent the adsorption, and a too high haze degree of a film layer may not be advantageous for a displaying brightness and the peep-proof effect. In practical applications, the haze degree of each of the surface of the first polarizer 106 proximal to the light adjustment layer 103 and/or the surface of the light adjustment layer 103 proximal to the first polarizer 106 may be 10% to 25%, and may be set according to requirements of actual applications.

In some embodiments, as shown in FIG. 4, the display device further includes the plurality of second microstructures 108 disposed with an interval therebetween (or spaced apart from each other) and disposed on the side (or surface) of the first polarizer 106 proximal to the light adjustment layer 103 and/or on the side (or surface) of the light adjustment layer 103 proximal to the first polarizer 106.

It should be noted that, the second microstructures 108 may increase the haze degree of the surface of the first polarizer 106 proximal to the light adjustment layer 103 and/or the haze degree of the surface of the light adjustment layer 103 proximal to the first polarizer 106, thereby preventing the first polarizer 106 and the light adjustment layer 103 from adsorbing each other, ensuring that the light adjustment layer 103 is uniformly distributed, avoiding the generation of a nonuniform air gap, avoiding the defect of rainbow stripes, and improving the display effect.

In some embodiments, as shown in FIGS. 2 and 3, each of the second microstructures 108 may include a transparent particle or a microlens.

For example, a plurality of transparent particles may be coated on the surface of the first polarizer 106 proximal to the light adjustment layer 103 and/or the surface of the light adjustment layer 103 proximal to the first polarizer 106, to increase a haze degree of a matte surface of the first polarizer 106 and/or a haze degree of a matte surface of the light adjustment layer 103 (as shown in FIG. 2). As such, the first polarizer 106 and the light adjustment layer 103 can be prevented from adsorbing each other, thereby ensuring the light adjustment layer 103 to be uniformly distributed, avoiding the generation of a nonuniform air gap, avoiding the defect of rainbow stripes, and improving the display effect. In a case where each of the second microstructures 108 includes a microlens, the plurality of microlenses can increase the haze degree of the matte surface of the first polarizer 106 and/or the haze degree of the matte surface of the light adjustment layer 103, and can prevent the first polarizer 106 and the light adjustment layer 103 from adsorbing each other. Different from the plurality of transparent particles, the plurality of microlenses can further converge light to a certain extent except being capable of preventing the first polarizer 106 and the light adjustment layer 103 from adsorbing each other, so as to further improve the peep-proof effect.

In some embodiments, each of the second microstructures 108 and the light adjustment layer 103 are integrally formed, or each of the second microstructures 108 and the first polarizer 106 are integrally formed.

For example, each of the second microstructures 108 may be integrally formed with the light adjustment layer 103, i.e., each of the second microstructures 108 is formed on the light adjustment layer 103. Alternatively, each of the second microstructures 108 may be integrally formed with the first polarizer 106, i.e., each of the second microstructures 108 is formed on the first polarizer 106. For example, during a manufacturing process, the plurality of transparent particles may be coated or the plurality of microlenses may be formed, on the side of the light adjustment layer 103 proximal to the first polarizer 106. Alternatively, the plurality of transparent particles may be coated or the plurality of microlenses may be formed, on the side of the first polarizer 106 proximal to the light adjustment layer 103. In an embodiment of the present disclosure, it is feasible that at least one of two opposite sides of both the first polarizer 106 and the light adjustment layer 103 is a matte surface.

It should be further noted that, each of the second microstructures 108 in the present embodiment may have the same structure as that of each of the first microstructures 104 provided in any one of the above embodiments, and differences therebetween lie only in their formation positions and their functions. During the manufacturing process, a same process may be employed to form each second microstructure 108 and each first microstructure 104.

In an embodiment, a diameter of each of the plurality of transparent particles which are the plurality of second microstructures 108 or a diameter of each of the plurality of microlenses which are the plurality of second microstructures 108 is in the range of 50 μm to 100 μm. In this way, each of the second microstructures 108 can be prevented from causing the light adjustment layer from generating any protrusion 30.

In an embodiment, the plurality of microlenses have a same diameter and are uniformly distributed in an array. By this configuration, it is possible to completely prevent the light adjustment layer from having any protrusion 30 and to reduce the difficulty in manufacturing the display device.

In an embodiment, an interval (or distance) between any adjacent two of the plurality of microlenses is greater than a radius of any one of the plurality of microlenses. In this way, at least one piece of foreign matter 20 can be located in a space between any adjacent two of the microlenses to prevent the light adjustment layer from generating any protrusion 30.

In an embodiment, the plurality of second microstructures 108 are located on the surface of the light adjustment layer 103 proximal to the first polarizer 106 or on the surface of the first polarizer 106 proximal to the light adjustment layer 103. In this way, the first polarizer 106 and the light adjustment layer 103 can be prevented from adsorbing each other, thereby preventing display defects such as the rainbow stripes from occurring.

In an embodiment, the plurality of first microstructures 104 (e.g., the plurality of transparent particles or the plurality of microlenses) may be formed on a lower substrate layer 1034 of the light adjustment layer 103, and the plurality of second microstructures 108 (e.g., the plurality of transparent particles or the plurality of microlenses) may be formed on an upper substrate layer 1034 of the light adjustment layer 103, as shown in FIG. 6. Further, in the case where both the plurality of first microstructures 104 and the plurality of second microstructures 108 are plurality of microlenses, the plurality of microlenses may have a same diameter and all have a hemispherical structure (which has a plane and a convex surface). Further, the plane of each microlens formed on the lower substrate layer 1034 of the light adjustment layer 103 contacts the lower substrate layer 1034, and the plane of each microlens formed on the upper substrate layer 1034 of the light adjustment layer 103 contacts the upper substrate layer 1034.

In the display device provided by the above embodiments of the present disclosure, the space formed between any adjacent two of the first microstructures 104 can accommodate tiny foreign matter that may be present during a manufacturing process, thereby avoiding the pockmark defect caused by the foreign matter. At least one of the opposite surfaces of the first polarizer 106 and the light adjustment layer 103 is configured to be a matte surface, for example, is (or are respectively) provided with the plurality of second microstructures 108, thereby avoiding mutual adsorption between the first polarizer 106 and the light adjustment layer 103, and avoiding the defect of the rainbow stripes. As a result, the display effect of the display device can be improved, and thus a use experience of a user is improved.

It is to be understood that, the foregoing embodiments of the present disclosure may be combined with each other to derive new embodiments, in a case where there is no explicit conflict.

It should be understood that the above embodiments are merely exemplary embodiments adopted to explain the principle of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. A backlight assembly, comprising:
a light source unit;
a peep-proof layer on a light emitting side of the light source unit;
a light adjustment layer on a side of the peep-proof layer distal to the light source unit; and a plurality of first microstructures between the peep-proof layer and the light adjustment layer and spaced apart from each other, wherein the plurality of first microstructures comprises a plurality of microlenses, and wherein the plurality of microlenses have a same diameter and are uniformly distributed in an array.

2. The backlight assembly according to claim 1, wherein the plurality of first microstructures are integrally formed with the light adjustment layer or with the peep-proof layer.

3. The backlight assembly according to claim 1, wherein the light adjustment layer comprises polymer dispersed liquid crystal.

4. The backlight assembly according to claim 1, wherein a diameter of each of the plurality of transparent particles or a diameter of each of the plurality of microlenses is in a range of 50 μm to 100 μm.

5. The backlight assembly according to claim 1, wherein an interval between any adjacent two of the plurality of microlenses is greater than a radius of any one of the plurality of microlenses.

6. The backlight assembly according to claim 2, wherein the plurality of first microstructures are on a surface of the light adjustment layer proximal to the peep-proof layer, or on a surface of the peep-proof layer proximal to the light adjustment layer.

7. The backlight assembly according to claim 6, wherein the surface of the light adjustment layer proximal to the peep-proof layer or the surface of the peep-proof layer proximal to the light adjustment layer has a haze degree of 10% to 25%.

8. A display device, comprising:
the backlight assembly according to claim 1;
a display panel on the light adjustment layer; and
a first polarizer on a side of the display panel proximal to the light adjustment layer and a second polarizer on a side of the display panel distal to the light adjustment layer;
wherein the display device further comprises a preset gap between the first polarizer and the light adjustment layer.

9. The display device according to claim 8, wherein a surface of the first polarizer proximal to the light adjustment layer is a matte surface and/or a surface of the light adjustment layer proximal to the first polarizer is a matte surface.

10. The display device according to claim 9, wherein the surface of the first polarizer proximal to the light adjustment layer and/or the surface of the light adjustment layer proximal to the first polarizer each have a haze degree of 10% to 25%.

11. The display device according to claim 8, further comprising a plurality of second microstructures, which are spaced apart from each other and on a side of the first polarizer proximal to the light adjustment layer and/or on a side of the light adjustment layer proximal to the first polarizer.

12. The display device according to claim 11, wherein the plurality of second microstructures comprises a plurality of transparent particles or a plurality of microlenses.

13. The display device according to claim 11, wherein the plurality of second microstructures are integrally formed with the light adjustment layer or with the first polarizer.

14. The display device according to claim 12, wherein a diameter of each of the plurality of transparent particles or a diameter of each of the plurality of microlenses is in a range of 50 μm to 100 μm.

15. The display device according to claim 12, wherein the plurality of microlenses have a same diameter and are uniformly distributed in an array.

16. The display device according to claim 15, wherein an interval between any adjacent two of the plurality of microlenses is greater than a radius of any one of the plurality of microlenses.

17. The display device according to claim 13, wherein the plurality of second microstructures are on a surface of the light adjustment layer proximal to the first polarizer or on a surface of the first polarizer proximal to the light adjustment layer.

18. The display device according to claim 8, wherein the preset gap is 2 mm.

* * * * *